R. W. ERDLE.
PROCESS OF MANUFACTURING SELF LUMINOUS DEVICES.
APPLICATION FILED MAY 16, 1918.
1,410,741.
Patented Mar. 28, 1922.
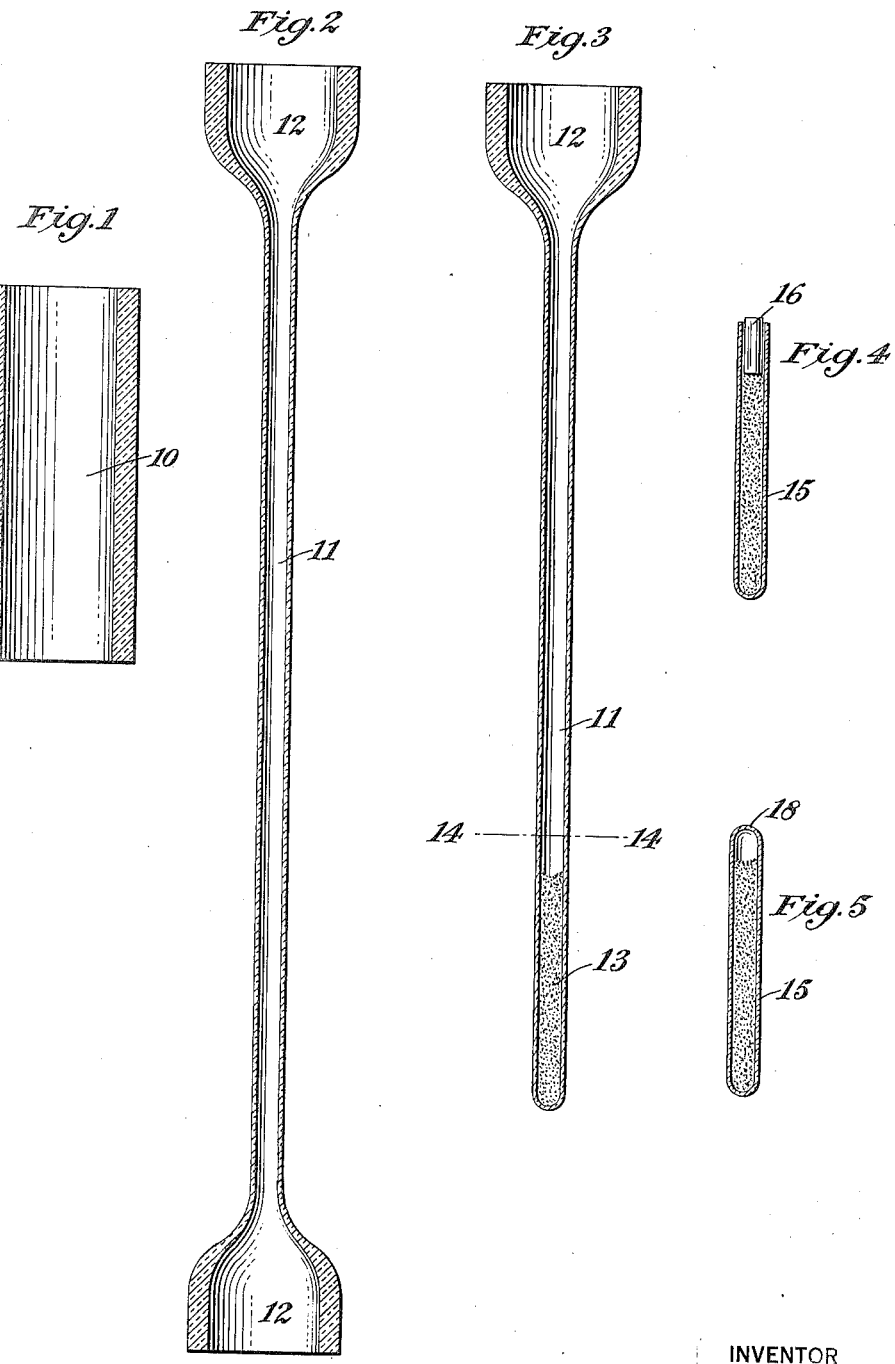
INVENTOR
Reiner W. Erdle
BY Albert J. Day
ATTORNEY

UNITED STATES PATENT OFFICE.

REINER W. ERDLE, OF WEEHAWKEN, NEW JERSEY, ASSIGNOR TO THE COLD LIGHT MANUFACTURING COMPANY, A CORPORATION OF COLORADO.

PROCESS OF MANUFACTURING SELF-LUMINOUS DEVICES.

1,410,741.  Specification of Letters Patent.  Patented Mar. 28, 1922.

Application filed May 16, 1918. Serial No. 234,849.

*To all whom it may concern:*

Be it known that I, REINER W. ERDLE, a subject of the Emperor of Germany, who have declared my intention of becoming a citizen of the United States, and now residing in Weehawken, in the county of Hudson and State of New Jersey, have invented certain new and useful Processes of Manufacturing Self-Luminous Devices, set forth in the following specification and illustrated in the accompanying drawings.

In certain pending applications for United States patents, I have described various devices for locating articles in the dark, which devices are constructed to receive removable self-luminous elements consisting of transparent receptacles, preferably of tubular form, containing a self-luminous substance. For obvious reasons these elements are necessarily small, and in some instances are very minute indeed, and therefore the filling of these elements presents a problem of some difficulty.

My present invention relates to a process whereby this problem is satisfactorily solved, and by the practice of which I am able to fill and manufacture small self-luminous elements of the character above described rapidly, efficiently and cheaply.

In the manufacture of these elements the best transparent material to be used is glass, and in the accompanying drawings I have illustrated the various steps of my process as preferably carried out. In these drawings, Figure 1 is a sectional view of the glass tubing in its initial state, Figure 2 is a similar view of the same after stretching, Figure 3 is a similar view of a part of the same in the next stage of my process, Figure 4 is a similar view of a completed self-luminous element, and Figure 5 is a similar view of a modified form of completed element.

In the commencement of my process, I take a relatively short section of glass tubing 10 of relatively large diameter and subject the middle portion thereof to a sufficient degree of heat to soften the same. For this purpose I may use a gas flame or other suitable source of heat. When the glass has been sufficiently softened, I subject the tube to a quick stretching tension until the middle portion assumes the reduced diameter desired for the finished element. The tube will then have the appearance shown in Figure 2 of my drawings, wherein the reduced portion 11 ends in funnel-shaped portions 12.

This is allowed to cool and is then severed in a well known manner, preferably at or near the middle, so as to form two thin tubes each having one funnel-shaped end. The small end of each of these severed tubes is then sealed, preferably by fusion, and then assumes the form shown in Figure 3. It will, of course, be understood that the tube shown in Figure 2 may be severed at any desired point, as, for instance, near one end, thus producing only one section of the nature shown in Figure 3.

The next step in the process is introducing the self-luminous substance (preferably in finely powdered form) into the lower end of the tube through the funnel at the top, as shown at 13, in Figure 3. The filled portion is then cut off a sufficient distance above the level of the self-luminous substance (as at the line 14—14) to leave a material space above it. This space is found necessary to accommodate a stopper, or, when sealing by fusion is resorted to, it avoids interference with the sealing process as well as preventing impairment of the qualities of the self-luminous material due to the effect of heat.

Lastly, the small filled portion of tube thus removed is closed at the severed end. This may be accomplished in various ways. In producing the form shown in Figure 4, the end of a glass rod covered with a thin cementing material, such as shellac, is introduced into the open end of the element 15, and this end is then cut or broken off, leaving a permanent stopper 16.

Another mode of finishing the element is shown in Figure 5, where the upper end 18 of the same is closed by fusing the same by heat in a manner well understood in the art.

These small self-luminous elements are found useful in a great variety of devices. For instance, such an element as is shown either in Figure 4 or Figure 5 may be placed in the tube of a level indicator such as is used to show the level of water in a boiler. Here it will float upon the water and thus make it possible to observe the water level in the dark.

As each filled portion is removed from the lower end of the tube in the stage shown in Figure 3, the bottom of the unfilled part is again sealed or closed and the filling and severing operation is repeated. This is continued until all of the reduced portion has been used up, thereby forming a number of elements from each tube.

What I claim is—

1. The process of manufacturing a self-luminous element which consists in introducing a self-luminous substance into the bottom of a transparent tube closed at its lower end, separating the filled portion of said tube, and closing the end thereof.

2. The process of manufacturing a self-luminous element which consists in stretching a heated glass tube of relatively large diameter to form a relatively thin tube having funnel-shaped ends, severing said tube and closing the severed end, introducing a self-luminous substance into the lower closed end of said tube, separating the filled portion of said tube, and closing the end thereof.

3. The process of manufacturing a plurality of self-luminous elements from a single transparent tube which consists in closing the bottom thereof, and introducing therein a small quantity of a self-luminous substance, separating and closing the filled portion and repeating the operation with successive portions of the original tube.

In testimony whereof, I have affixed my signature to this specification.

REINER W. ERDLE.